March 10, 1942.  V. C. PARKER  2,275,988

ELECTRICAL EDUCATOR

Filed Aug. 28, 1940  2 Sheets-Sheet 1

INVENTOR
VERN C. PARKER
By Minturn & Minturn
ATTORNEYS

March 10, 1942.  V. C. PARKER  2,275,988
ELECTRICAL EDUCATOR
Filed Aug. 28, 1940  2 Sheets-Sheet 2

INVENTOR,
VERN C. PARKER,
BY Minturn & Minturn
ATTORNEYS.

Patented Mar. 10, 1942

2,275,988

UNITED STATES PATENT OFFICE 2,275,988

ELECTRICAL EDUCATOR

Vern C. Parker, near Stilesville, Ind.

Application August 28, 1940, Serial No. 354,574

4 Claims. (Cl. 35—9)

This invention relates to instruction charts displaying the names of objects, such as birds, animals, flowers, or of other listing, such as states, capitals, countries, flags, or the like, together with pictures, emblems, or other data so remotely displayed as only to be identified by a person having a previous acquaintance with the subject matter, the display being used as a quiz to ascertain the knowledge on the subject of a person under examination, or to drill and teach them.

For example, in the chart of birds shown in the drawings, the leader points out the name of "flicker" and asks the student to find and designate the picture of a flicker on the chart.

An important object of the invention is to make a successful effort so impressive that the lesson will be as interesting as a game and in which the result will remain indelibly impressed on the student's mind.

To this end, electrical sockets are provided close to the name, and also at its picture or emblem. These are connected by a conductor wire which is also wired to a buzzer or to a lamp and supplied with current so that when the leader plugs in as at a bird name and asks the student to plug in at the picture of that bird, the buzzer will sound or light come on, or both, provided he can locate the picture.

I accomplish the above and other objects which will hereinafter appear by the means illustrated in the accompanying drawings, in which Fig. 1 is a front side elevation of a chart of birds embodying my invention;

Like characters of reference indicate like parts in the several views in the drawings.

Figure 1:
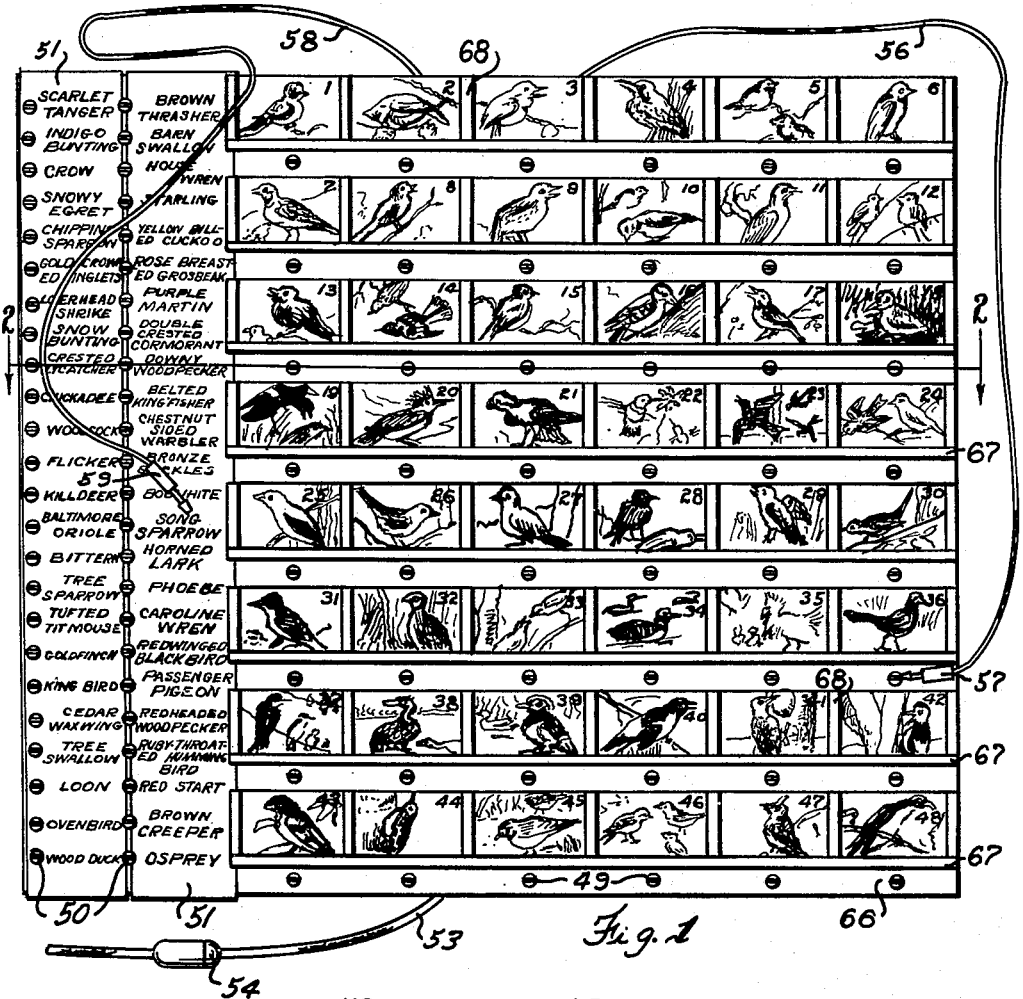
Figure 2:
Fig. 2 is a detail in section on the line 2—2 of Fig. 1.
Figure 5:
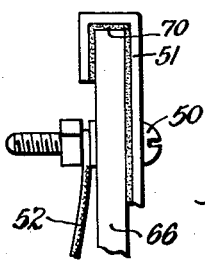
Fig. 5 is a view on an enlarged scale in left-hand elevation of a fragment of the upper left-hand corner of the chart shown in Fig. 1.

The body 66 of the chart is made out of wood, as here shown, but may be a composition board, a sheet of metal or other material capable of sufficient support to the members attached and carried by it.

A major portion of the front side of the body 66 is divided by horizontal strips 67 and vertical strips 68, into eight rows of six spaces in each row. The strips 67 and 68 are channeled on their edges next to each space to retain cards, here numbered 1 to 48, inclusive, which are removable for easy changes.

On the cards are pictures of the charted things, each here shown as bearing the picture of a different bird, but other things than birds may be pictured.

Under each picture space or panel defined by strips 67 and 68 is an electrical terminal or socket 49, here shown as a screw bolt with a hemispherical slotted head, but which may be the well known cylindrical socket, and assembled on the body 66, here shown as in two vertical rows at the left end of the body, are like sockets 50. The name of a bird (in this case) is printed opposite each socket 50, and that socket is wired electrically with a socket 49, under the picture of that bird on the body of the chart. To make the names removable to correspond with the chart pictures when the latter are changed, I prefer to print the names, properly spaced, on a strip of paper, here shown as two in number, 51, 51, extended around the top and bottom edges of the body 66 and having the ends of the strips pasted to the back of the chart by any suitable adhesive 70.

Figure 3:
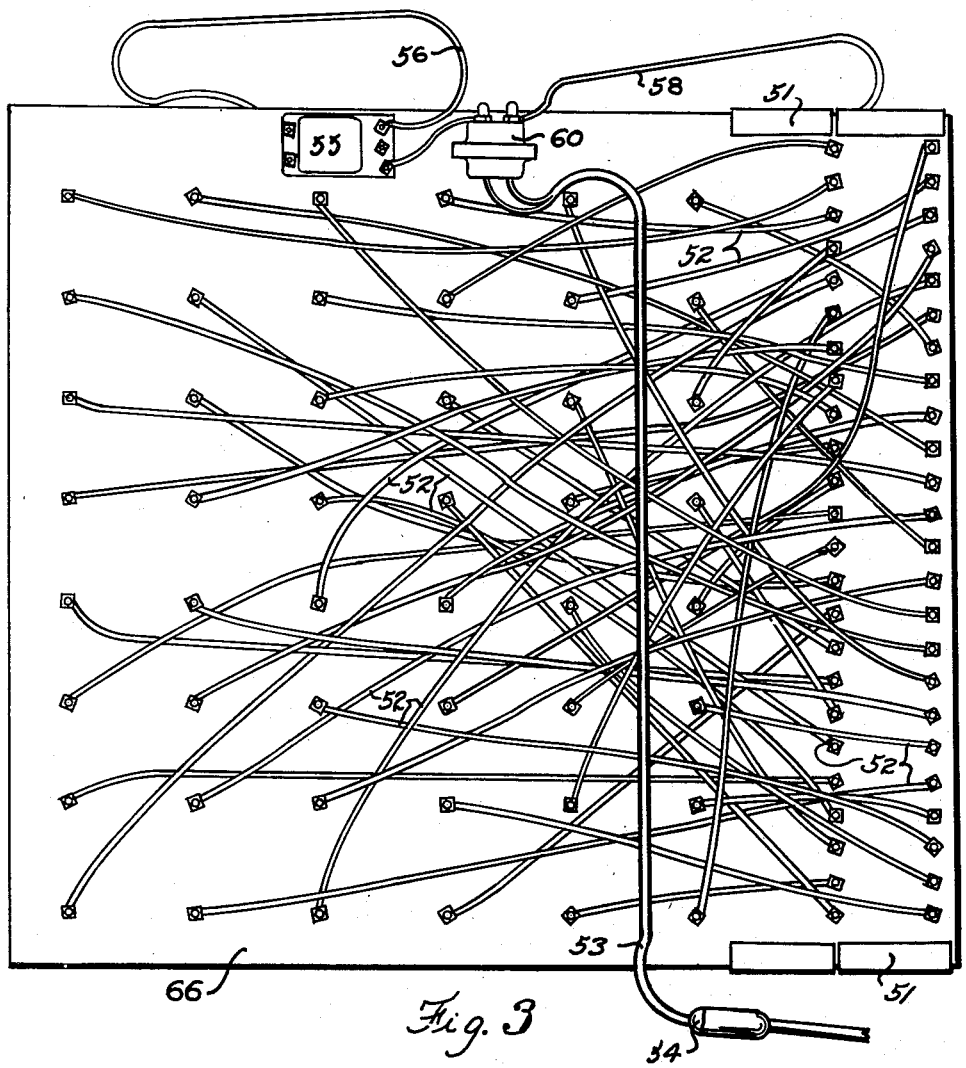
Fig. 3 is a rear side elevation of the chart, showing the electrical installation.

Each pair of corresponding sockets 49 and 50 are connected by the insulation covered wires 52. (See Fig. 3.) A transformer 60 is attached to the body 66 through which current passes through wires in cable 53 having plug 54 to plug into a socket (not shown) connected with any suitable source of current.

A buzzer 55, also attached to the body 66, is wired to one of the binding posts of the transformer and is connected with a conductor 56 terminating with a plug 57 to be plugged into one of the sockets 49.

A conductor 58 is connected at one end with the other binding post of the transformer 60 and at its other end with a plug 59 to be plugged into one of the sockets 50.

When plug 59 is in a socket 50, the buzzer will sound when the plug 57 is plugged into the socket 49 in which the plug 57 is seated.

Figure 4:
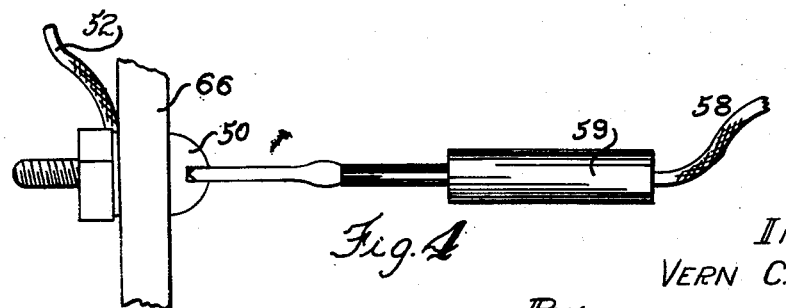
Fig. 4 is a detail in enlarged view of a socket with a plug inserted therein.

As shown in the drawings, and particularly in Fig. 4, the sockets 49 and 50 may be screw bolts with hemispherical heads diametrically slotted, and the plugs may be screw drivers, the blades of which are inserted in the slots and will there remain until removed, as when a single person is using the device. Then he plugs in on the name of a bird, the likeness of which he is not familiar with and plugs in under the pictures until he sounds the buzzer by trial and error. Conversely, he may plug in under a picture and try out the names until the buzzer informs him of the right one. As shown in Fig. 1, the heads of the bolts overlap the edges of the name strips to hold the strips during the initial adjustment of the strips.

In general practice the leader plugs in a name and asks a student to designate the bird by plugging in the proper socket, or if the leader holds both plugs, the numbers 1 to 48 respectively on the pictures enable the student to call the picture which he thinks is right. If correct, the buzzer sounds from the plug inserted by the leader, and if wrong, the buzzer does not sound.

The device has been found to be eminently educational, and it is susceptible to many variations as for animals, fishes, insects, flowers, etc., and inanimate, such as names and maps of states and countries, capitals and flags of the countries, machines, works of art, etc., in endless variety.

While I have herein shown and described my invention in the one particular form, it is obvious that structural variations may be employed without departing from the spirit of the invention and I, therefore, do not desire to be limited to that precise form beyond the limitations as may be imposed by the following claims.

I claim:

1. In an electrical educator, a rigid body, a plurality of pictures removably secured to the body, each picture being of an object different from the others, and numbered consecutively, names of the objects also removably secured to the body and placed remote from its picture on strips of paper extended across the front and around the top and bottom edges of the body and ends pasted to the back of the body, said body having a socket at each name and its corresponding picture, and said board having a signaling device transformer, and a source of current in circuits open between a picture socket and its name socket, and said body having a pair of plugs and conductors connecting the plugs with the circuit and closing the circuit when one of the plugs is seated in a name socket and the other is seated in its corresponding picture socket to operate the signaling device.

2. In an electrical educator, a rigid body, a plurality of receptacles on the body for removably holding cards, each displaying a picture of a different object, names on the body of the objects on the cards on strips crossing the front and wrapped around the top and bottom edges of the body and pasted at their ends to the back of the body, an electrical socket by each name and picture, an electrical signaling device, an electrical circuit broken between the sockets, and a pair of plugs in the circuit adapted to close the circuit and actuate the signal when one plug is in a picture socket and the other plug is in its name socket, said card holding receptacle being formed of horizontal and vertical strips channeled on their edges next to the receptacles.

3. In an electrical educator, a rigid body, a plurality of receptacles on the body for removably holding cards, each displaying a picture of a different object, names on the body of the objects on the cards, on strips crossing the front and wrapped around the top and bottom edges of the body and pasted at their ends to the back of the body, an electrical socket by each name and picture, an electrical signaling device, an electrical circuit broken between the sockets, and a pair of plugs in the circuit adapted to close the circuit and actuate the signal when one plug is in a picture socket and the other plug is in its name socket, said card holding receptacle being formed of horizontal and vertical strips channeled on their edges next to the receptacles, and said sockets being screw bolts with slotted hemispherical heads overlapping the name strips and said plugs being blades adapted for insertion in the slots.

4. In an electrical educator, a rigid body, a plurality of pictures secured to the body by channeled strips, each picture being of an object different from the others and numbered consecutively, names of the objects on the body remote from its picture on strips crossing the front of the body and pasted at their ends to the back of the body, an electric terminal at each name, an electric terminal under each picture, the terminal of each name being electrically connected with the terminal of its picture and also electrically connected with a signaling device, a transformer, a source of current, a plug electrically connected with the transformer and a plug electrically connected with the signaling device, said plug completing the circuit when contacted respectively with the terminal under a name and the terminal under the picture of the object there named.

VERN C. PARKER.